United States Patent
Widzgowski

(10) Patent No.: US 6,859,294 B2
(45) Date of Patent: Feb. 22, 2005

(54) METHOD FOR ASCERTAINING POSITION VALUES, AND SCANNING MICROSCOPE

(75) Inventor: Bernd Widzgowski, Dossenheim (DE)

(73) Assignee: Leica Microsystems Heidelberg GmbH, Mannheim (DE)

(*) Notice: Subject to any disclaimer, the term of this patent is extended or adjusted under 35 U.S.C. 154(b) by 0 days.

(21) Appl. No.: 10/235,256

(22) Filed: Sep. 5, 2002

(65) Prior Publication Data
US 2003/0063367 A1 Apr. 3, 2003

(30) Foreign Application Priority Data
Sep. 11, 2001 (DE) .......................................... 101 44 593

(51) Int. Cl.[7] .............................................. G02B 26/08
(52) U.S. Cl. .................................... 359/199; 359/368
(58) Field of Search ................................ 359/198, 199, 359/202, 212, 213, 214, 215, 223, 224, 225, 368, 385

(56) References Cited

U.S. PATENT DOCUMENTS

| 5,121,138 | A |   | 6/1992 | Schermer et al. ........... 346/108 |
|---|---|---|---|---|
| 5,225,923 | A |   | 7/1993 | Montagu ..................... 359/199 |
| 5,629,790 | A | * | 5/1997 | Neukermans et al. ........ 359/198 |
| 6,037,583 | A | * | 3/2000 | Moehler et al. ............ 250/235 |
| 6,040,567 | A |   | 3/2000 | Neher et al. ................ 250/208 |
| 6,547,145 | B2 | * | 4/2003 | Colley et al. .......... 235/462.36 |
| 6,653,621 | B2 | * | 11/2003 | Wine et al. ................ 250/235 |

FOREIGN PATENT DOCUMENTS

| DE | 4116387 | 12/1991 |
|---|---|---|
| DE | 4322694 | 1/1994 |
| DE | 19702752 | 7/1998 |
| DE | 19710714 | 9/1998 |

* cited by examiner

Primary Examiner—Mark A. Robinson
(74) Attorney, Agent, or Firm—Davidson, Davidson & Kappel, LLC

(57) ABSTRACT

A scanning microscope is disclosed. The scanning microscope comprises a light source which emits an illuminating light beam for illumination of a specimen, a resonant beam deflection device, for guiding the illuminating light beam over the specimen, which has a resonant frequency and a resonant frequency range, and an independent oscillator with which a drive oscillation, which has a drive frequency within the resonant frequency range can be generated which drives the beam deflection device. Furthermore a method is disclosed for controlling a scanning microscope having a resonant beam deflection.

23 Claims, 2 Drawing Sheets

METHOD FOR ASCERTAINING POSITION VALUES, AND SCANNING MICROSCOPE

CROSS REFERENCE TO RELATED APPLICATIONS

This application claims priority of the German patent application 101 44 593.8 which is incorporated by reference herein.

FIELD OF THE INVENTION

The invention concerns a method for controlling a scanning microscope.

The invention furthermore concerns a scanning microscope, especially a confocal scanning microscope.

BACKGROUND OF THE INVENTION

In scanning microscopy, a specimen is illuminated with a light beam in order to observe the reflected or fluorescent light emitted by the specimen. The focus of the illuminating light beam is moved in a specimen plane by means of a controllable beam deflection device, generally by tilting two mirrors; the deflection axes are usually perpendicular to one another, so that one mirror deflects in the X direction and the other in the Y direction. Tilting of the mirrors is brought about, for example, by means of galvanometer positioning elements. The power level of the detected light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam.

A confocal scanning microscope generally comprises a light source, a focusing optical system with which the light of the source is focused onto an aperture stop (called the "excitation pinhole"), a beam splitter, a beam deflection device for beam control, a microscope optical system, a detection pinhole, and the detectors for detecting the detected or fluorescent light. The illuminating light is coupled in via a beam splitter. The fluorescent or reflected light coming from the specimen travels through the beam deflection device back to the beam splitter, passes through it, and is then focused onto the detection pinhole behind which the detectors are located. Detected light that does not derive directly from the focus region takes a different light path and does not pass through the detection pinhole, so that a point datum is obtained which results, by sequential scanning of the specimen, in a three-dimensional image. A three-dimensional image is usually achieved by acquiring image data in layers.

Ideally, the track of the scanning light beam on or in the specimen describes a meander (scanning one line in the X direction at a constant Y position, then stopping the X scan and slewing by Y displacement to the next line to be scanned, then scanning that line in the negative X direction at constant Y position, etc.). At increasingly high beam deflection speeds, the scanning track deviates more and more from the meander shape. This phenomenon is attributable essentially to the inertia of the moving parts. With rapid scanning, the scanning track looks rather like a sine curve, but it often happens that the portion of the track curve for scanning in the positive X direction differs from the portion of the track curve for scanning in the negative X direction.

The power level of the light coming from the specimen is measured at fixed time intervals during the scanning operation, and thus sampled one grid point at a time. The measured value must be unequivocally assigned to the associated scan position so that an image can be produced from the measured data.

Advantageously, the status data of the beam deflection device adjustment elements are continuously measured concurrently for this purpose; or, although this is less accurate, the reference control data for the beam deflection device are used directly.

The use of resonantly operating beam deflection devices in order to obtain higher scanning rates is known. In this context, the beam deflection device, which is often embodied as a galvanometer mirror, is operated in a feedback circuit in which a position sensor ascertains the present position of the mirror and converts it into an electrical signal that is then amplified and conveyed to the beam deflection device as the driving signal. This ensures that the beam deflection device is always operated at the resonant frequency, which can fluctuate considerably e.g. as a result of temperature changes.

German Patent Application DE 41 16 387 A1 describes a control system for a laser printer that contains a resonant scanning device having an oscillating mirror which guides the laser beam over the surface of the printing medium in order to illuminate successive pixel locations with the laser beam. Each complete mirror oscillation corresponds to one scanning cycle. A controller serves to pulse the laser source in accordance with a selected image. A synchronization device serves to synchronize the operation of the controller with the angular motion of the mirror. The synchronization device operates continuously during each scanning cycle, and adjusts the operating frequency of the controller, as a function of changes in the angular velocity of the mirror and changes in the resonant frequency of the resonant scanning device, by the fact that a laser pulse timer signal is delivered to the controller.

German Patent Application DE 43 22 694 A1 describes a confocal microscope that contains a scanner arrangement in which the deflection arrangement along the X axis contains two resonant scanners that oscillate about parallel axes at different frequencies, one of which is a harmonic of the other. As a result thereof, scanning along the X axis can be performed almost linearly even though it occurs in conjunction with a resonance, and advantages associated with the rapidity of resonant systems can therefore be achieved. One galvanometer rotates the housing of one of the resonant scanners about its axis in order to achieve an X-axis pivot function.

In order to obtain a defect-free image of the specimen, the time for cycling through one scan line must be a multiple of the time for scanning one specimen point. If this condition is not met, distortion occurs due to image point shifts in successive lines. Since the resonant frequency of the beam deflection device depends on the scanning conditions (for example the maximum deflection of the scanning mirror) and environmental conditions (in particular the temperature), and thus continually fluctuates, whereas the time for scanning a specimen point is constant, with resonant beam deflection devices a faster scanning speed can be obtained only at the expense of image quality.

SUMMARY OF THE INVENTION

It is therefore the object of the invention to describe a method for controlling a scanning microscope with which optimum image quality can be obtained even in the context of changes in the scanning and environmental parameters.

The object is achieved by means of a method for controlling a scanning microscope comprising the following steps:

generating, with an independent oscillator, an electrical drive oscillation that has a drive frequency, the drive frequency lying within the resonant frequency range; and transferring the drive oscillation to a resonant beam deflection device that has a resonant frequency and a resonant frequency range Another object of the invention is to describe a scanning microscope with which optimum image quality can be obtained even at high scanning speed and even in the context of changes in the scanning and environmental parameters.

This object is achieved by means of a scanning microscope comprising:

a light source which emits an illuminating light beam for illumination of a specimen, a resonant beam deflection device, for guiding the illuminating light beam over the specimen, which has a resonant frequency and a resonant frequency range, an independent oscillator with which a drive oscillation, which has a drive frequency within the resonant frequency range can be generated which drives the beam deflection device.

The invention has the advantage that both a high scanning speed and optimum image quality can be obtained simultaneously.

In a preferred embodiment, the electrical drive oscillation is generated from a basic oscillation that has a basic frequency, the basic frequency being a first integral multiple of the drive frequency. Preferably the basic oscillation is a square-wave oscillation. The drive oscillation is preferably a sine oscillation or a sinusoidal oscillation.

In a preferred embodiment, the oscillator contains a digital-analog converter and counters.

The method can comprise the further step of generating from the basic oscillation a pixel clock rate which has a pixel frequency, the basic frequency being a second integral multiple of the pixel frequency. The further steps of guiding an illuminating light beam line by line over a specimen using the beam deflection device, and detecting detected light proceeding from the specimen at the pixel clock rate, can furthermore be provided.

In a further embodiment, the drive oscillation has an amplitude, and fluctuations in the resonant frequency or fluctuations in the deflection of the beam deflection device resulting from a change in the resonant frequency are compensated for by controlling the amplitude. In particular in order to compensate for larger fluctuations, provision is made for increasing or decreasing the first integral multiple in accordance with the sign of the change in the resonant frequency.

The oscillator preferably generates a basic oscillation which has a basic frequency from which the drive oscillation is synthesized. The basic frequency is a first integral multiple of the drive frequency.

The basic oscillation is preferably a square-wave oscillation. It can also, however, be a sine oscillation, a sine-like oscillation, or any other oscillation.

Two embodiments, in particular, are suitable for synthesizing the drive oscillation from the basic oscillation:

a. In one embodiment, the data values of the complete curve are stored in a memory and are outputted from it cyclically at a high output frequency (>50 MHz). A very fast memory and a very fast digital-analog converter are necessary here. At an output frequency of e.g. 50 MHz and a resonant frequency of 4 kHz, 12,500 values per period are outputted. With this method, adjustment of the drive frequency—for example in order to compensate for drift in the resonant frequency of the galvanometer—requires recalculation of a very large number of values.

b. In another embodiment, the fact that the system behavior of a resonant beam deflection device (e.g. a galvanometer) corresponds to that of a very high-quality bandpass filter is exploited. It is sufficient if the spectrum of the basic oscillation contains the resonant frequency. Any other frequencies that are present are damped by the system behavior. Precise generation of the drive oscillation requires exact adherence to the output time of the values.

In a preferred embodiment, the oscillator contains at least one digital-analog converter and counters. One of the counters is configured, in order to generate the basic oscillation, as a ring counter with the highest possible counting frequency. The oscillator generates from the basic oscillation a pixel clock rate which has a pixel frequency, the basic frequency being a second integral multiple of the pixel frequency.

The illuminating light beam, guided preferably continuously and preferably line by line over or through the specimen, causes a continuous flow of detected light that is converted, with a detector, into an electrical signal proportional to the power level. The pixel clock rate indicates which portions of the detected light flow are to be associated with an image point (pixel). The detected light proceeding from the specimen is detectable at the pixel clock rate.

In a particularly preferred embodiment, a modulation means is provided with which the amplitude of the drive oscillation can be varied. This embodiment has the particular advantage that fluctuations in the resonant frequency that can be caused by a modification of the scanning parameters or a change in the environmental parameters can be compensated for by controlling the amplitude in open- or closed-loop fashion. A change in the resonant frequency can be ascertained by way of a relative measurement of the drive power required for the drive oscillation.

In particular in the context of larger changes in resonant frequency that can no longer be compensated for by way of open- or closed-loop control of the amplitude, provision is made for adapting the pixel clock rate. For that purpose, means are provided for varying the first integral multiple. The pixel clock rate is preferably generated by division from the basic oscillation, in which context the means for varying the first integral multiple modify the divisor.

In a preferred embodiment, the scanning microscope is a confocal scanning microscope.

BRIEF DESCRIPTION OF THE DRAWINGS

The subject matter of the invention is depicted schematically in the drawings and will be described below with reference to the Figures, in which.

DETAILED DESCRIPTION OF THE INVENTION

Figure 1:
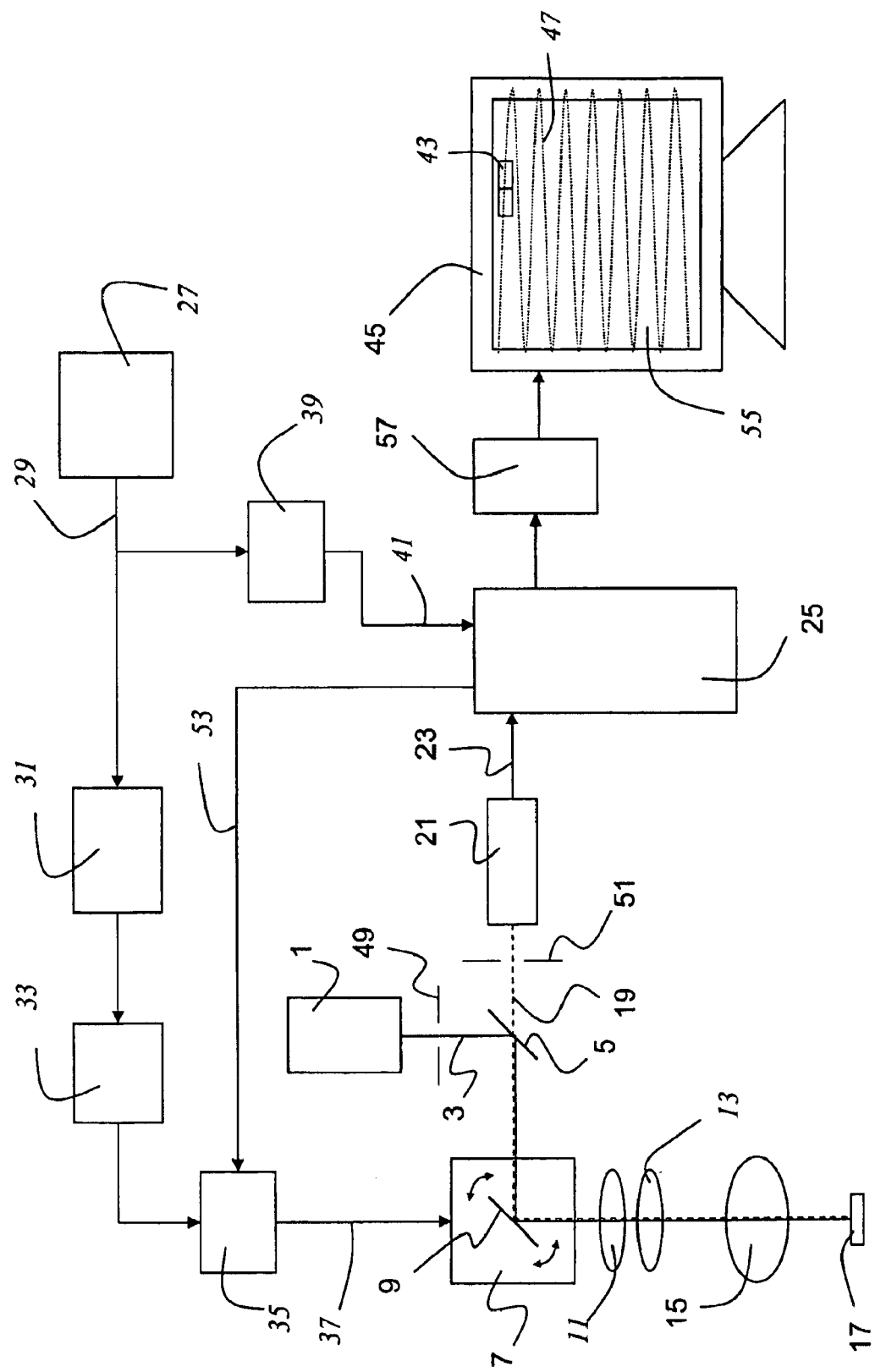
FIG. 1 shows a scanning microscope according to the present invention.

FIG. 1 shows a scanning microscope according to the present invention that is embodied as a confocal scanning microscope. Light beam 3 coming from an illumination system 1 is reflected by a beam splitter 5 to beam deflection device 7, which contains a gimbal-mounted scanning mirror 9 that guides the beam through scanning optical system 11, tube optical system 13, and microscope optical system 15 over or through specimen 17. In the case of non-transparent specimens 17, light beam 3 is guided over the specimen surface. With biological specimens 17 (preparations) or transparent specimens, light beam 3 can also be guided through specimen 17. This means that different focal planes of specimen 17 are successively scanned by light beam 3. Subsequent assembly then yields a three-dimensional image of specimen 17. Light beam 3 coming from illumination system 1 is depicted as a solid line. Detected light 19 proceeding from specimen 17 travels through microscope optical system 15, tube optical system 13, scanning optical system 11 and via beam deflection device 7 to beam splitter 5, passes through the latter and strikes detector 21, which is embodied as a photomultiplier. Detected light 19 proceeding from specimen 17 is depicted as a dashed line. In detector 21, electrical detected signals 23 proportional to the power level of detected light 19 proceeding from the specimen are generated and forwarded to processing unit 25. Position signals sensed in the beam deflection device with the aid of an inductively or capacitatively operating position sensor are also transferred to processing unit 25. An oscillator 27 generates a basic oscillation 29, which has a basic frequency of 80 MHz, in the form of a square-wave oscillation. The latter is divided by 20,000 using a divider module 31, and the zero order is then synthesized with a filter 33. The resulting signal is amplified with an amplifier 35, and delivered to beam deflection device 7 as drive oscillation 37. Amplifier 35 is embodied as a controllable amplifier, which makes possible regulation of the amplitude of the drive oscillation by way of a control signal 53 that is calculated by processing unit 25 and transferred to amplifier 35. A portion of basic oscillation 29 is transferred to a further divider 39, which performs a division by four and thereby generates a pixel clock rate 41 having a pixel frequency of 20 MHz. Illuminating light beam 3, guided preferably continuously and preferably line by line over or through the specimen, causes a continuous flow of detected light 19. Pixel clock rate 41 indicates which portions of the detected light flow are to be associated with an image point 43 (pixel). The position signals and detected signals 23 are associated with one another in processing unit 25, and assembled from image points 43 into an image 55 that is displayed on display 45 of a PC 57. For better comprehension, the drawing schematically shows scanning track 47, not visible in image 55, along which the illuminating line is directed through specimen 17. The time for scanning one image line is an integral multiple of the time during which data are received for one pixel. Image defects resulting from the shifting of pixels in successive lines are thereby eliminated. Illumination pinhole 49 and detection pinhole 51 that are usually provided in a confocal scanning microscope are schematically drawn in for the sake of completeness. Omitted in the interest of better clarity, however, are certain optical elements for guiding and shaping the light beams. These are sufficiently familiar to the person skilled in this art.

Figure 2:
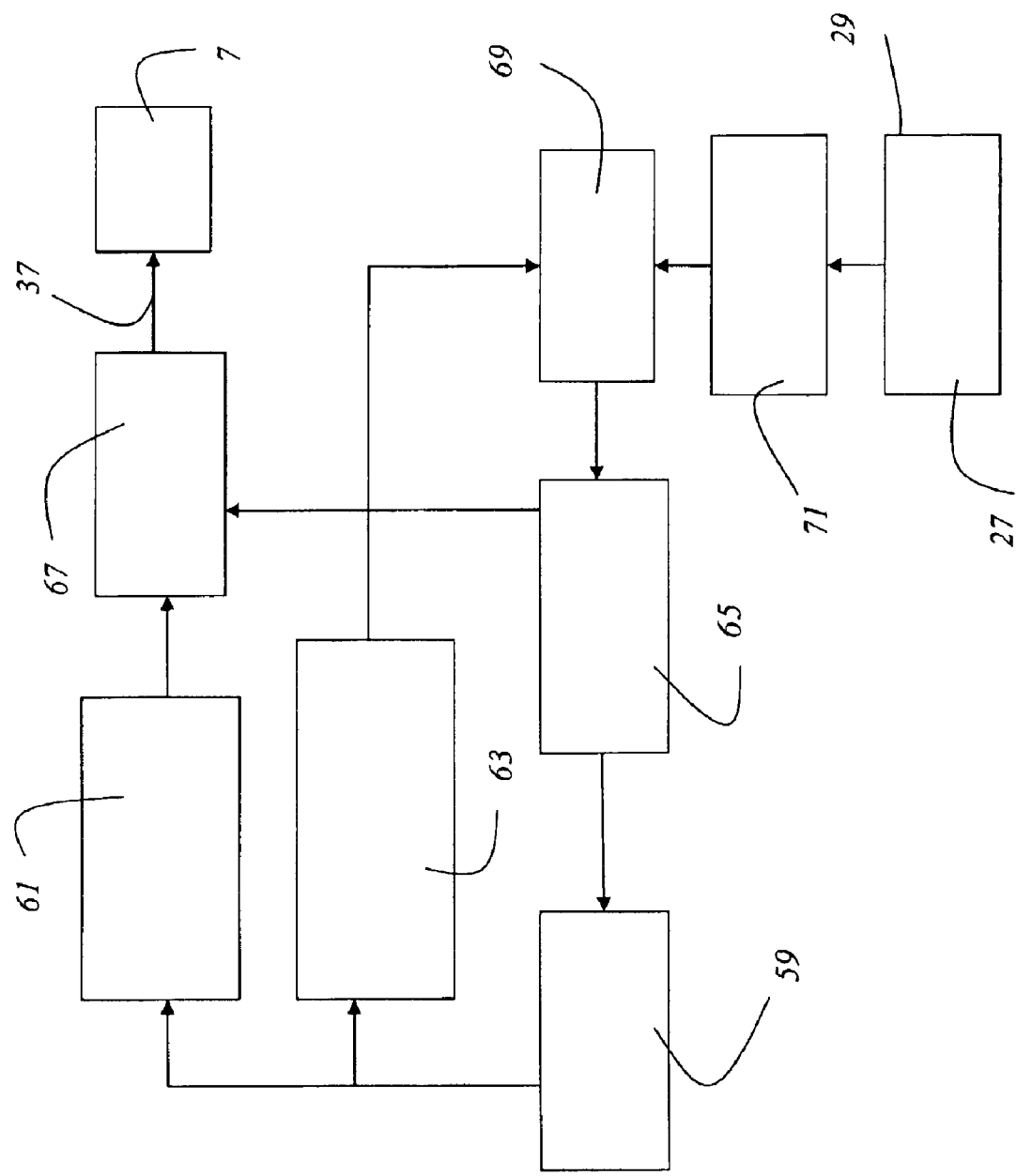
FIG. 2 schematically depicts the generation of the drive oscillation.

FIG. 2 schematically depicts the generation of the drive oscillation. Oscillator 27 generates a basic oscillation 29. The period of basic oscillation 29 represents the resolution with which the period of the synthesized drive oscillation 37 can be adjusted. Basic oscillation 29 is forwarded to a ring counter 71. One counter pass is equal to the period of the synthesized signal. This counter functions here as a time standard. Further counter 59, also designed as a ring counter, serves as an index counter for a first memory 61 and a further memory 63. The two tables 61, 63 have the same dimensions (m possible index values). Counter 59 can address all m values in one pass before jumping back to the initial value. The output time represented by a count status of ring counter 71 is stored under an index value I in second memory 63. The value that is to be outputted when oscillator 27 has reached the value TA(I) is stored in first memory 61. Comparator 69 compares TA(I) to the ring counter status. When the two values are identical, this is recognized by control logic 65, which initiates on the one hand a write cycle of digital-analog converter 67 which converts the digital value TW(I) into the drive oscillation 37 for beam deflection device 7, and on the other hand an incrementing of the counter of the further counter 59. Regarding the contents of the tables, it should be ensured that the output time values in second memory 63 increase strictly monotonically, and that the largest value in second memory 63 is smaller than the maximum count status of ring counter 71.

The invention has been described with reference to a particular exemplary embodiment. It is nevertheless self-evident that changes and modifications can be made without thereby leaving the range of protection of the claims below.

What is claimed is:

1. A method for controlling a scanning microscope comprising the following steps:
   generating, with an independent oscillator, an electrical drive oscillation that has a drive frequency, the drive frequency lying within the resonant frequency range;
   transferring the drive oscillation to a resonant beam deflection device that has a resonant frequency and a resonant frequency range;
   guiding an illuminating light beam line by line over a specimen using the beam deflection device; and
   detecting detected light proceeding from the specimen at a frequency derived from an oscillation frequency of the independent oscillator.

2. The method as defined in claim 1, wherein the electrical drive oscillation is generated from a basic oscillation that has a basic frequency, the basic frequency being a first integral multiple of the drive frequency.

3. The method as defined in claim 2, wherein the basic oscillation is a square-wave oscillation.

4. The method as defined in claim 2, wherein fluctuations in the resonant frequency are compensated for by adapting the first integral multiple.

5. The method as defined in claim 1, wherein the drive oscillation is a sine oscillation.

6. The method as defined in claim 1, wherein the independent oscillator contains a digital-analog converter and counters.

7. The method as defined in claim 1, further comprising the step of:
   generating from the basic oscillation a pixel clock rate which has a pixel frequency, the basic frequency being a second integral multiple of the pixel frequency.

8. The method as defined in claim 1, wherein the drive oscillation has an amplitude, and fluctuations in the resonant frequency are compensated for by controlling the amplitude.

9. A scanning microscope comprising:
   a light source which emits an illuminating light beam for illumination of a specimen,
   a resonant beam deflection device, for guiding the illuminating light beam over the specimen, which has a resonant frequency and a resonant frequency range, an independent oscillator with which a drive oscillation, which has a drive frequency within the resonant frequency range can be generated which drives the beam deflection device, and a detector for detecting detected light proceeding from the specimen at a frequency derived from an oscillation frequency of the independent oscillator.

10. The scanning microscope as defined in claim 9, wherein the electrical drive oscillation in the oscillator can be generated from a basic oscillation which has a basic frequency, the basic frequency being a first integral multiple of the drive frequency.

11. The scanning microscope as defined in claim 10, wherein the basic oscillation is a square-wave oscillation.

12. The scanning microscope as defined in claim 10, wherein the oscillator contains a ring counter with which the basic oscillation can be generated.

13. The scanning microscope as defined in claim 10 further comprising means for varying the first integral multiple.

14. The scanning microscope as defined in claim 13, wherein fluctuations in the resonant frequency can be compensated for by adapting the first integral multiple.

15. The scanning microscope as defined in claim 9, wherein the basic oscillation is a sine oscillation.

16. The scanning microscope as defined in claim 9, wherein the oscillator contains at least one digital-analog converter and counters.

17. The scanning microscope as defined in claim 9, wherein the oscillator generates from the basic oscillation a pixel clock rate which has a pixel frequency, the basic frequency being a second integral multiple of the pixel frequency.

18. The scanning microscope as defined in claim 17, further comprising a detector for detecting detected light proceeding from the specimen at the pixel clock rate.

19. The scanning microscope as defined in claim 9, wherein the illuminating light beam can be guided line by line over the specimen.

20. The scanning microscope as defined in claim 9, further comprising a means for varying an amplitude of the drive oscillation.

21. The scanning microscope as defined in claim 20, wherein fluctuations in the resonant frequency can be compensated for by controlling the amplitude in open- or closed-loop fashion.

22. A confocal scanning microscope comprising:

a light source which emits an illuminating light beam for illumination of a specimen, a resonant beam deflection device, for guiding the illuminating light beam over the specimen, which has a resonant frequency and a resonant frequency range, an independent oscillator with which a drive oscillation, which has a drive frequency within the resonant frequency range can be generated which drives the beam deflection device, and a detector for detecting detected light proceeding from the specimen at a frequency derived from an oscillation frequency of the independent oscillator.

23. The scanning microscope as defined in claim 22, wherein the electrical drive oscillation in the oscillator can be generated from a basic oscillation which has a basic frequency, the basic frequency being a first integral multiple of the drive frequency.

* * * * *